United States Patent
Roider

(10) Patent No.: US 10,308,228 B2
(45) Date of Patent: Jun. 4, 2019

(54) LAND VEHICLE WITH A CHASSIS AND A PLURALITY OF CORNER SUPPORT UNITS ATTACHED THERETO

(71) Applicant: HOERBIGER AUTOMATISIERUNGSTECHNIK HOLDING GMBH, Altenstadt (DE)

(72) Inventor: Peter Roider, Lappersdorf (DE)

(73) Assignee: HOERBIGER AUTOMATISIERUNGSTECHNIK HOLDING GMBH, Altenstadt (DE)

( * ) Notice: Subject to any disclaimer, the term of this patent is extended or adjusted under 35 U.S.C. 154(b) by 1 day.

(21) Appl. No.: 15/880,744

(22) Filed: Jan. 26, 2018

(65) Prior Publication Data

US 2018/0148018 A1 May 31, 2018

Related U.S. Application Data

(63) Continuation of application No. PCT/EP2016/068035, filed on Jul. 28, 2016.

(30) Foreign Application Priority Data

Jul. 28, 2015 (DE) ........................ 10 2015 112 321

(51) Int. Cl.
  *B60S 9/12* (2006.01)
  *B60S 9/22* (2006.01)
  *B60P 3/36* (2006.01)

(52) U.S. Cl.
  CPC . *B60S 9/12* (2013.01); *B60P 3/36* (2013.01); *B60S 9/22* (2013.01)

(58) Field of Classification Search
  CPC . B66C 23/78; B66C 23/80; B60S 9/00; B60S 9/02; B60S 9/10; B60S 9/12; B60S 9/22
  See application file for complete search history.

(56) References Cited

U.S. PATENT DOCUMENTS

| | | | | |
|---|---|---|---|---|
| 3,062,385 A | * | 11/1962 | Thompson | .............. B66C 23/80 |
| | | | | 280/766.1 |
| 3,219,362 A | * | 11/1965 | Epstein | ..................... B60S 9/02 |
| | | | | 248/615 |

(Continued)

FOREIGN PATENT DOCUMENTS

| | | |
|---|---|---|
| DE | 7806499 U1 | 10/1978 |
| DE | 102010020452 A1 | 11/2011 |

(Continued)

OTHER PUBLICATIONS

International Search Report, dated Sep. 30, 2016, for corresponding International Application No. PCT/EP2016/068035.

*Primary Examiner* — James A Shriver, II
*Assistant Examiner* — Vaughn Coolman
(74) *Attorney, Agent, or Firm* — Myers Wolin, LLC

(57) ABSTRACT

A land vehicle is provided having a chassis and having a plurality of corner support units. Each of the corner support units has a support leg which is mounted in a swiveling manner in a bearing shoe, which is rigidly attached to the land vehicle, about a substantially horizontal axis. The length of the support leg is telescopically variable. The support leg comprises at least two pipe sections, which can be displaced relative to each other in the longitudinal direction. A hydraulic cylinder is arranged in the interior of the support leg by means of which the position of the at least two pipe sections relative to each other, and consequently the length of the support leg, can be modified. A separate hydraulic assembly, arranged on the bearing shoe of each affected corner support unit and loading the hydraulic cylinder, is allocated to each corner support unit.

17 Claims, 3 Drawing Sheets

(56) References Cited

U.S. PATENT DOCUMENTS

| | | | | |
|---|---|---|---|---|
| 3,666,290 | A * | 5/1972 | Dalton | B60S 9/02 16/42 T |
| 3,734,531 | A * | 5/1973 | Metaillier | B66C 23/80 280/764.1 |
| 3,857,582 | A * | 12/1974 | Hartog | B60S 9/02 248/354.1 |
| 3,901,532 | A * | 8/1975 | Hornagold | B66C 23/80 280/766.1 |
| 3,912,288 | A * | 10/1975 | F'Geppert | B66C 23/80 200/188 |
| 3,990,714 | A * | 11/1976 | Hornagold | B66C 23/80 212/304 |
| 4,061,309 | A | 12/1977 | Hanser | |
| 4,118,054 | A * | 10/1978 | Vigerie | B66C 23/80 212/304 |
| 4,165,861 | A * | 8/1979 | Hanser | B60S 9/12 254/423 |
| 4,174,094 | A | 11/1979 | Valdespino et al. | |
| 4,235,542 | A | 11/1980 | Paterik, Jr. | |
| 4,394,912 | A * | 7/1983 | Epps | B66C 23/78 212/303 |
| 4,619,369 | A * | 10/1986 | Mertens | E04G 21/0436 212/304 |
| 4,634,144 | A * | 1/1987 | Ringe | B60S 9/02 16/42 T |
| 4,662,610 | A * | 5/1987 | Cofer | B60S 9/02 254/420 |
| 4,743,037 | A * | 5/1988 | Hanser | B60S 9/12 180/41 |
| 4,784,400 | A | 11/1988 | Hofius | |
| 5,013,011 | A | 5/1991 | Halloway | |
| 5,143,386 | A * | 9/1992 | Uriarte | B60S 9/02 180/41 |
| 5,192,102 | A * | 3/1993 | Mertens | B60S 9/02 200/61.44 |
| 5,409,251 | A * | 4/1995 | Thorndyke | B60S 9/12 280/475 |
| 6,089,603 | A | 7/2000 | Ackley | |
| 6,099,034 | A * | 8/2000 | Fujishima | B60S 9/12 280/763.1 |
| 6,619,693 | B1 | 9/2003 | Sproatt et al. | |
| 9,701,286 | B2 * | 7/2017 | Dickerson | B60S 9/08 |
| 9,963,123 | B2 * | 5/2018 | Dominguez | B60S 9/04 |
| 2004/0046337 | A1 | 3/2004 | Sproatt et al. | |
| 2006/0082079 | A1 | 4/2006 | Eichhorn | B60S 9/12 280/6.155 |
| 2007/0180719 | A1 * | 8/2007 | Donnelly | B60S 9/02 33/366.11 |
| 2010/0301293 | A1 * | 12/2010 | Venter | B66C 23/80 254/93 A |
| 2012/0173094 | A1 * | 7/2012 | Steinich | B66C 23/78 701/50 |
| 2015/0006027 | A1 * | 1/2015 | Maurer | B60S 9/02 701/36 |
| 2015/0054271 | A1 * | 2/2015 | Geates | B60S 9/12 280/766.1 |
| 2015/0129821 | A1 * | 5/2015 | Dickerson | B60S 9/08 254/93 VA |
| 2016/0075311 | A1 * | 3/2016 | Garceau | B60S 9/12 701/36 |
| 2016/0185322 | A1 * | 6/2016 | Vierkotten | B66C 23/80 701/50 |
| 2017/0326691 | A1 * | 11/2017 | Harper | B23P 11/00 |

FOREIGN PATENT DOCUMENTS

| | | |
|---|---|---|
| EP | 0163544 A2 | 12/1985 |
| EP | 1000828 A1 | 5/2000 |
| EP | 2418131 A1 | 2/2012 |
| GB | 2109322 A | 6/1983 |
| WO | 2007023347 A1 | 3/2007 |

* cited by examiner

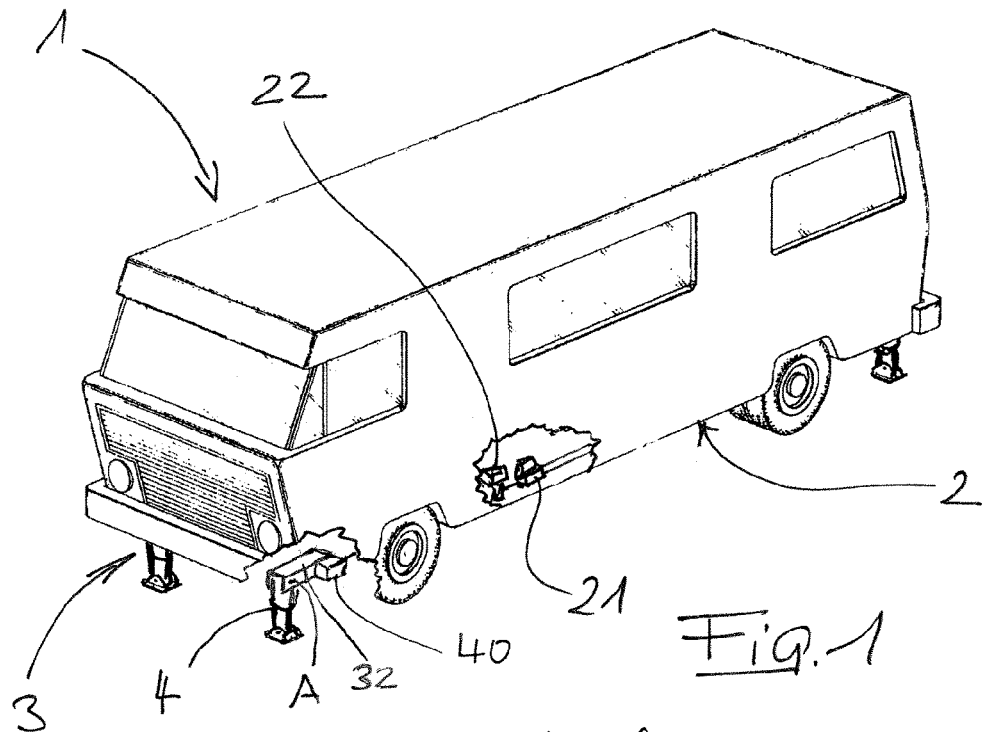
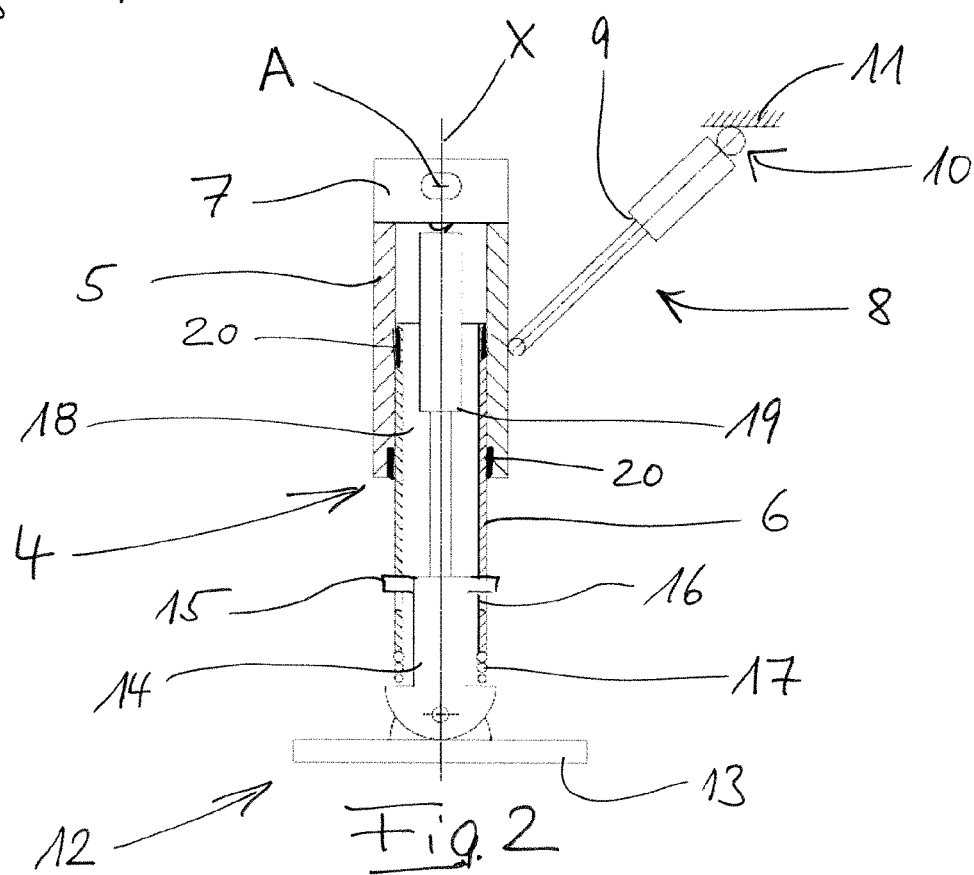

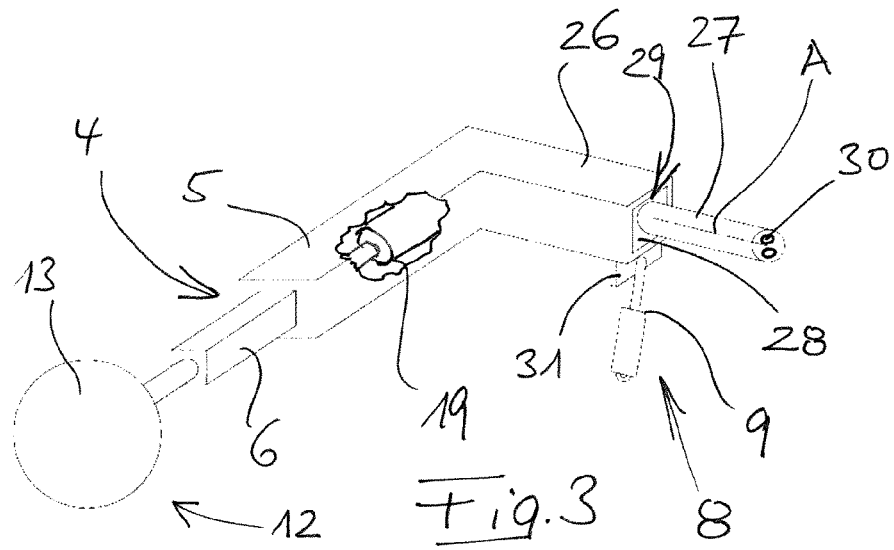
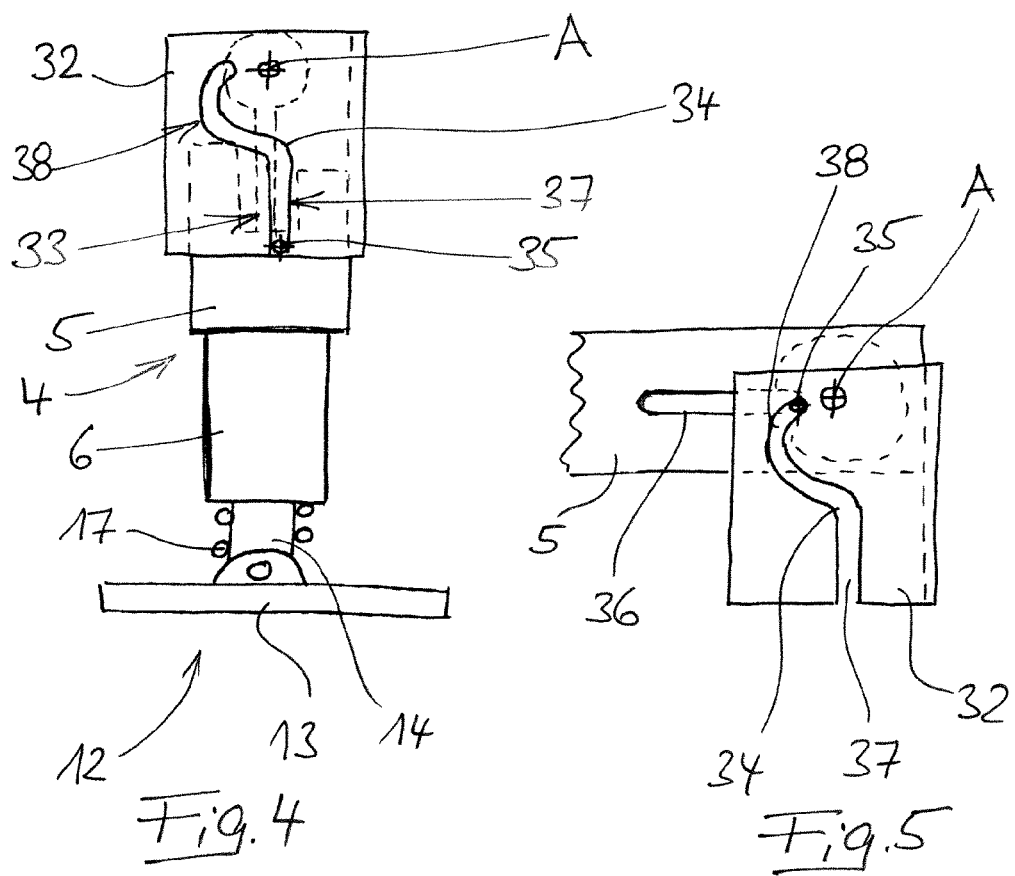

LAND VEHICLE WITH A CHASSIS AND A PLURALITY OF CORNER SUPPORT UNITS ATTACHED THERETO

CROSS REFERENCE TO RELATED APPLICATIONS

This application is a continuation under 35 U.S.C. § 120 of International Application PCT/EP2016/068035, filed Jul. 28, 2016, which claims priority to German Application 10 2015 112 321.5, filed Jul. 28, 2015, the contents of each of which are incorporated by reference herein.

FIELD OF THE INVENTION

The present invention relates to a land vehicle with a chassis and a plurality of corner support units attached thereto.

BACKGROUND

For various land vehicles, it is important that they can be leveled in parked condition (on a ground surface) and be stabilized in the leveled position. This is the case in particular for camping vehicles, particularly for recreational vehicles. For this purpose, the land vehicles in question are provided with several corner support units, which respectively comprise a support leg that can be lowered onto the ground surface.

Such corner support units are known in various designs. In this connection, a distinction must be made in particular as to whether a support leg with fixed predetermined length (e.g. DE 7806499 U, U.S. Pat. No. 6,089,603 A, EP 163544 A, GB 2109322 A) or else a support leg with variable length is used. In the last case mentioned, the support legs may in particular comprise several elements that can be displaced longitudinally (e.g. hydraulically) in the manner of a telescope relative to one another or else several members joined in the manner of a scissors lift (see U.S. Pat. No. 4,784,400 A) to one another in articulated manner, wherein the longitudinally displaceable support leg in question may additionally be mounted to swivel (between an operating position and a storage position) around a substantially horizontal axis. Examples of the prior art in this regard can be found in WO 2007/023347 A1, U.S. Pat. No. 4,174,094 A, U.S. Pat. No. 6,619,693 B1, US 2004/0046337 A1, EP 1000828 A1, U.S. Pat. No. 5,013,011 A and U.S. Pat. No. 4,061,309 A, the disclosure of which is incorporated by reference as content of the present Application. In the case of corner support units with a support leg having a fixed predetermined length, the support leg is regularly mounted to swivel around a substantially horizontal axis. In order to brace the land vehicle on the ground surface, the support leg in this case is swiveled from its raised storage position into its lowered operating position, until it rests on the ground surface via a foot disposed (in articulated manner if necessary) at its end, and the land vehicle in conjunction with its further corner support units is leveled and stabilized in the leveled position.

In view of the partly conflicting requirements (e.g. high performance capability, large working range, small overall size or small dimensions, robustness, high reliability, low manufacturing costs, possible retrofit capability, etc.), as are imposed in practice on the corner support units themselves under consideration here and on their integration into the vehicle environment, it proves difficult for which the large number of approaches (see above) can be rated as an indicator to conceive of a solution that is satisfactory in every respect.

SUMMARY

The objective of the present invention is to contribute to an improvement of the functional capability of land vehicles with corner support units mentioned in the introduction. In particular, it is intended to provide such a land vehicle wherein the leveling system, which is used to level the vehicle and to stabilize it in the leveled position and which comprises a plurality of corner support units, that on the whole satisfies the requirements imposed in practice to the best possible extent.

This object is achieved by the land vehicle specified in the claims. One of the core features of the present invention that achieves the foregoing object is therefore that each of the corner support units has a support leg, which is mounted in articulated manner to swivel around a substantially horizontal axis in a bearing shoe attached rigidly to the land vehicle, and the length of which is telescopically variable. Each of these support leg comprises at least two tubular portions that can be displaced relative to one another in longitudinal direction of the support leg, and a hydraulic cylinder is disposed in the interior of the support leg. The position of the at least two tubular portions relative to one another (and thus the length of the support leg) can be varied by means of the said hydraulic cylinder. The hydraulic cylinder may therefore also be referred to as a lifting cylinder, because therewith corresponding to the possible stroke length the support foot disposed in end position on the support leg can be retracted and extended. What is decisive in this connection is that force-transmitting guidance of the at least two tubular portions of the support leg relative to one another is provided (for example, by means of suitable slideways), so that transmission of force components directed transversely to the longitudinal axis of the support leg in question takes place directly from one tubular portion to the other tubular portion. In contrast, no transverse forces of any kind act on the (separate) hydraulic cylinder disposed in the interior of the support leg. To the contrary, the hydraulic cylinder is loaded exclusively in its longitudinal direction, i.e. in axial direction of the support leg, during operation of the respective corner support unit. Consequently, that component of the force which is oriented in longitudinal direction of the support leg and is transmitted into the support foot is on the one hand decoupled, so to speak, from that force component which is oriented transversely to the longitudinal direction of the support leg and acts for example by developing due to placement of the support leg on an uneven ground surface on the support foot. The last-mentioned component is transmitted from the support foot via the at least two tubular portions and the bearing of the support leg (see hereinafter) directly into the land vehicle.

Furthermore, it is characteristic of the inventive land vehicle that the inventive land vehicle has several hydraulic aggregates, by the fact that each individual corner support unit is assigned its own hydraulic aggregate, which alone serves to pressurize the hydraulic cylinder (as well as an additional swiveling cylinder that may be provided; see hereinafter) disposed in the interior of the support leg of that corner support. In this connection, preferably a central control and regulating unit is provided, which controls the hydraulic aggregates depending on a position sensor, which senses the orientation of the vehicle in such a way that the land vehicle occupies and remains in the intended horizontal orientation. These decentrally provided hydraulic aggregates are particularly advantageously disposed in a mechanically protected position on the bearing shoes for the support legs, which shoes are rigidly attached to the land vehicle. The invention can be implemented by providing hydraulic lines, which are usually but certainly not necessarily flexible (see hereinafter), albeit of only short length and in a relatively protected arrangement, so that the risk of damaged hydraulic lines is small.

In this connection, the at least two tubular portions of each support leg may have circular cross sections. However, polygonal cross sections may prove particularly favorable, for example if the tubular portions are constructed in the shape of square or rectangular tubes.

Preferably the inventive land vehicle can be further improved by the features and technical viewpoints individually or else in combination with one another presented hereinafter.

Within the scope of the present invention, the respective support leg can typically be swiveled from a raised home or storage position (where it has been swiveled more or less horizontally) into a substantially vertical operating position. The said swiveling of the support leg can be achieved by providing a swiveling drive that specially serves this purpose, for example a hydraulic cylinder, which is linked on the one hand to the bearing shoe and on the other hand especially to the tubular portion of the support leg that is mounted thereon in articulated manner. Other swiveling drives familiar to the person skilled in the art (e.g. in the form of an electric motor) may likewise be considered.

According to another preferred improvement, no separate swiveling drive is provided, but instead the hydraulic cylinder disposed in the support leg not only causes the support leg to change its length telescopically but instead also causes it to swivel. This may take place in particular by using a sliding block guide, which couples the length change and the swiveling of the support leg mechanically with one another. In this context, for example in the case of a corner support having a support leg that comprises two tubular portions, at least one laterally protruding roller bolt, which passes through the outer tubular portion (e.g. via an oblong hole) and extends into a connecting link disposed on the bearing shoe, may be joined to the inner tubular portion. The geometry of this connecting link may in particular be chosen such that, at the beginning of extension of the support leg, the swiveling movement of the support leg from the storage position into the operating position takes place during a relatively short fraction of the stroke length, whereas, during the subsequent preponderant fraction of the stroke length, the support foot is lowered without further changing the orientation of the axis.

In yet another preferred improvement, the support foot disposed in end on the support leg is spring-mounted on the associated outermost tubular portion (at least in longitudinal direction of the support leg). Consequently, the support foot is able to act as a compressed spring to some extent relative to the outermost tubular portion of the support leg. This proves to be particularly advantageous with respect to keeping the land vehicle steady and in fixed position on a more or less soft ground surface, because all corner support units maintain ground contact within the range of the spring travel of the support foot relative to the associated tubular portion of the support leg, even if the ground surface gives way. In other respects, steadiness is favored when the support foot is constructed in the form of a plate mounted in articulated manner on the support leg via a universal joint.

In the case of swivelable support legs (see hereinabove), means may be additionally provided that are capable of securing the support leg when it is swiveled into its home or storage position. Mechanical means in particular (e.g. clamps) or else even magnetically acting means may be used for this purpose. In particular, the means in question for securing the support leg in its home position may engage with the outermost tubular portion carrying the support foot. This makes it possible to disengage the means simply, by lengthening the support leg using the hydraulic cylinder disposed in it telescopically.

In yet another preferred improvement, an external hydraulic pressure accumulator may be provided, which is maintained under pressure during regular operation. Via a manually actuatable emergency valve, the pressure accumulator can be placed in communication with a valve group, so that, in the emergency situation, all corner supports using the hydraulic energy stored in the hydraulic pressure accumulator can be retracted or extended at least one more time.

BRIEF DESCRIPTION OF THE DRAWING

By means of several preferred embodiments, significant technical viewpoints, features and aspects explained in the foregoing are illustrated in the attached drawing on the basis of appropriate specific details. The fact that, as stated hereinabove, the present invention is not limited to the exemplary embodiments according to the figures should be self-evident, but nevertheless is expressly emphasized once again here.

In the drawing,

FIG. 1 shows a schematic perspective view of a land vehicle equipped with four corner support legs attached to its chassis, FIG. 2 shows a vertical section through a first exemplary embodiment of a corner support unit that can be used within the scope of the present invention, FIG. 3 shows a perspective view of a second exemplary embodiment of a corner support unit that can be used within the scope of the present invention, FIG. 4 shows a side view of a third exemplary embodiment of a corner support unit that can be used within the scope of the present invention, with support leg swiveled into its operating position, FIG. 5 shows a partly cutaway view of the corner support unit according to FIG. 4 with its support leg swiveled into its storage position.

DETAILED DESCRIPTION OF THE PREFERRED EMBODIMENTS

Figure 6:
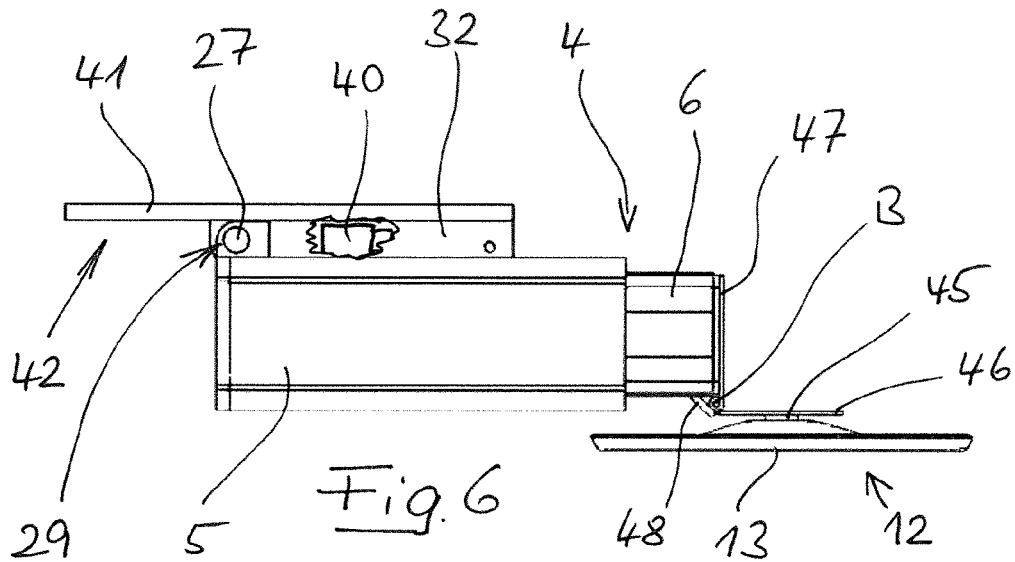
FIG. 6 shows a side view of a fourth exemplary embodiment of a corner support unit that can be used within the scope of the present invention, with its support leg swiveled into its storage position.

According to FIG. 1, land vehicle 1 constructed in the form of a recreational vehicle comprises a chassis 2. Four corner support units 3 are attached to this. Each of the four corner support units 3 has a support leg 4, the length of which can be varied telescopically. Since the land vehicle illustrated in the drawing corresponds to this extent to the sufficiently known prior art, further explanations are unnecessary.

In each corner support unit 3, support leg 4, as is illustrated schematically, is mounted to swivel around a horizontal axis A in a bearing shoe 32 joined rigidly to chassis 2 of land vehicle 1. A decentralized hydraulic aggregate 40 assigned to the respective corner support unit 3 is disposed on each bearing shoe.

According to the configuration illustrated in FIG. 2, support leg 4 of corner support unit 3 comprises two tubular portions that can be displaced relative to one another in longitudinal direction X of the support leg, namely an outer tubular portion 5 and an inner tubular portion 6. A head part 7, on which the support leg is mounted to swivel between a raised storage position and the substantially vertical operating position shown in FIG. 2 around a horizontal axis A, and which closes off support leg 3 at the top, is joined to outer tubular portion 5. In order to swivel support leg 3, a swiveling drive 8 with a hydraulic cylinder 9 that engages with outer tubular portion 5 is provided, wherein the other end 10 is braced against a counter bearing 11 integral with the chassis.

A support foot 12 is provided at the bottom end of inner tubular portion 6 of support leg 4. This comprises a plate 13, which is mounted to swivel on a carrying part 14. Carrying part 14 can be displaced in inner tubular portion 6 in longitudinal direction X of support leg 4, wherein the maximum displacement travel is defined by cooperation of a transverse bolt 15 disposed on carrying part 14 with two oblong holes 16 formed in inner tubular portion 6. In this connection, support foot 12 is spring-mounted on support leg 4, by the fact that a helical spring 17 extends between the front side of inner tubular portion 6 of support leg 4 and carrying part 14 of support foot 12. Thus support foot 12 can act as a spring that is compressed corresponding to its load.

A hydraulic cylinder 19 is disposed in the interior of support leg 4, i.e. in the cavity 18 bounded by outer tubular portion 5 and inner tubular portion 6. The position of the at least two tubular portions 5 and 6 relative to one another and thus the length of support leg 4 can be varied with this. The two tubular portions 5 and 6 are guided slidingly with low friction relative to one another by means of sliding bearing pieces 20, wherein the lower sliding bearing pieces 20 additionally prevent ingress of dirt into the interior of support leg 4.

The two hydraulic cylinders 9 and 19 of each corner support unit 3 are pressurized by decentralized hydraulic aggregate 40 (see hereinabove) associated respectively with them. Activation of the four decentralized hydraulic aggregates takes place by a central control and regulating unit 21 comprising a leveling controller, in response to a position sensor 22, which senses the orientation of the vehicle, in such a way that the land vehicle occupies and remains in the intended horizontal orientation (see FIG. 1).

The exemplary embodiment, shown in FIG. 3, of a corner support unit that can be used within the scope of the present invention corresponds largely to that according to FIG. 2. What must be noted here, however, is how the bearing which can be swiveled around axis A of support leg 4 is constructed differently. And, in fact, outer tubular portion 5 in this case has a lateral extension 26, which accommodates a bearing bush 28 that can be rotated on a (fixed) hub 27. In combination with one another, hub 27 and bearing bush 28 are capable of providing a hydraulic rotating coupling 29. For this purpose, two hydraulic ducts 30 made in hub 27 and connected to the hydraulic system discharge into respectively a circumferential groove made on the surface of hub 27. Two hydraulic ducts are likewise made in bearing bush 28. These discharge flush with the two circumferential grooves made on hub 27, and so they are in communication therewith and are connected to hydraulic cylinder 19 disposed in the interior of support leg 4.

Furthermore, in the exemplary embodiment according to FIG. 3, hydraulic cylinder 9 of swiveling drive 8 engages with respect to the specific installation situation not on outer tubular portion 5 of support leg 4, but instead on a tab 31 joined to lateral extension 26. In other respects, the exemplary embodiment according to FIG. 3 is explained directly by the foregoing explanations for FIG. 2. What is readily apparent here, however, is the construction of outer tubular portion 5 and of inner tubular portion 6 of support leg 4 with respectively a polygonal cross section, which in the present case is specifically square. Further explanations are unnecessary.

In the embodiment, shown in FIGS. 4 and 5, of a corner support unit 3 that can be used within the scope of the present invention, bearing shoe 32 is shown, which can be rigidly attached to chassis 2 of the land vehicle 1 in question, and in which support leg 4 is mounted to swivel around horizontal axis A. In this case, in contrast to what happens in the exemplary embodiments explained in the foregoing, swiveling of support leg 4 does not take place by means of a separate swiveling drive 8. To the contrary, the variation in length and the swiveling of support leg 4 are mechanically coupled with one another. For this purpose, a slideway 33 is provided, with a connecting link 34 disposed in bearing shoe 32. A roller bolt 35, which is joined to inner tubular portion 6 and which passes in an oblong hole 36 parallel to the axis through outer tubular portion 5, engages in this. The geometry of this connecting link 34 is configured such that, upon shortening of support leg 4 by retraction of inner tubular portion 6 into outer tubular portion 5, swiveling of support leg 4 does not takes place at all at first (due to the first straight portion 37, parallel to the axis, of connecting link 34) but instead support leg 4 is swiveled (by virtue of the second spiral-shaped portion 38 of connecting link 34), from the operating position (FIG. 4) into the storage position (FIG. 5) only in the second phase of its shortening. Conversely, therefore, during extension of inner tubular portion 6 of support leg 4 in order to lengthen it, the swiveling movement of support leg 4 from the storage position into the operating position already takes place during a relatively small fraction of the stroke length at the beginning of extension of inner tubular portion 6.

In other respects, the exemplary embodiment according to FIGS. 4 and 5 is explained by the foregoing explanations of the exemplary embodiments described hereinabove, and so no further explanations are needed.

The exemplary embodiment according to FIGS. 6 and 7 differs from the exemplary embodiments described in the foregoing especially as follows: In this case bearing shoe 32 that can be attached to chassis 2 of land vehicle 1 is dimensioned such that hydraulic cylinder 9 of swiveling drive 8 is braced against it with its end disposed opposite link point 39 on outer tubular portion 5. Because the dimensions of bearing shoe 32 are matched to the dimensions of outer tubular portion 5 of support leg 4, suitable space is also created for accommodation of decentralized hydraulic aggregate 40, which supplies only the corner support unit in question. This space is closed off at the bottom by support leg 4 in its storage position (FIG. 6), and so hydraulic aggregate 40 is particularly protected when the land vehicle is in motion, just as is hydraulic cylinder 9 of swiveling drive 8. In this case the supply of the (double-acting) hydraulic cylinder 19, disposed in the interior of the support leg takes place tubelessly from hydraulic aggregate 40, by the fact that a hydraulic rotating coupling 29, which among other components comprises hub 27, is provided in the region of swiveling axis A.

Figure 7:
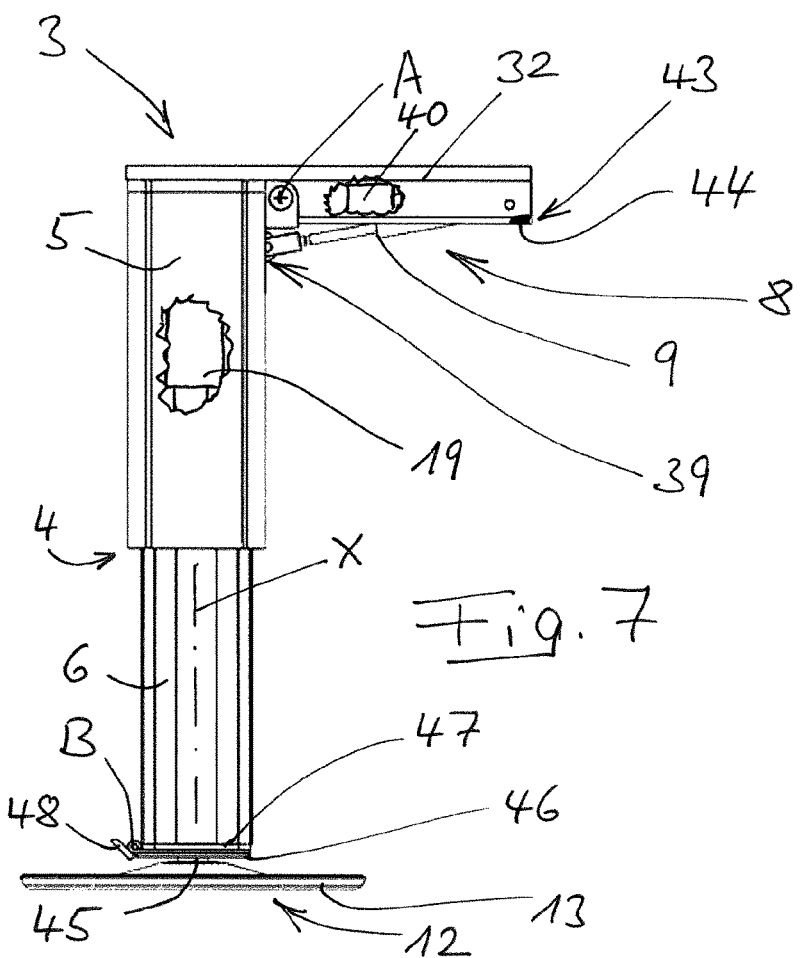
FIG. 7 shows the corner support unit according to FIG. 6 with support leg swiveled into its operating position and extended to its maximum length.

Bearing shoe 32 has an extension 42 constructed as a stop plate 41, against which support leg 4 is braced with its head part 7 in operating position (FIG. 7). Furthermore, securing means 43, which function to stabilize the orientation of support leg 4 in its storage position, are provided, in the form of a snap-in piece 44, which cooperates with a corresponding catch of the outer tubular portion 5 of support leg 4, on bearing shoe 32.

In this exemplary embodiment, plate 13 of support foot 12 can be swiveled (to a limited extent) in all directions, i.e. is mounted via a universal joint, at linkage point 45 on an intermediate plate 46. Intermediate plate 46 in turn is mounted to swivel eccentrically on bottom closure part 47 of support leg 4, wherein the corresponding swiveling axis B extends parallel to swiveling axis A of support leg 4. Hereby plate 13 of support foot 12 automatically occupies a flat traveling position defined by stop 48 when support leg 4 is raised, i.e. swiveled into its storage position (FIG. 6).

What is claimed is:

1. A land vehicle (1) with a chassis (2) and a plurality of corner support units (3) attached thereto, wherein:
    each of the corner support units (3) has a support leg (4), which is mounted in a bearing shoe (32) attached rigidly to the land vehicle (1) so as to swivel around a substantially horizontal axis (A);
    a length of the support leg (4) can be varied telescopically;
    the support leg (4) comprises at least two tubular portions (5, 6) that can be displaced relative to one another in a longitudinal direction (X) of the support leg;
    a hydraulic cylinder (19), by means of which a position of the at least two tubular portions (5, 6) relative to one another and thus the length of the support leg (4) can be changed, is disposed in an interior of the support leg (4);
    each corner support unit (3) is assigned a hydraulic aggregate (40) of its own, respectively disposed on the bearing shoe (32) of the corner support unit (3) in question,
    wherein a swiveling drive (8) is provided in the form of a hydraulic cylinder (9), and wherein the hydraulic cylinder (19) disposed in the interior of the support leg (4) and the hydraulic cylinder (9) of the swiveling drive (8) are pressurized by the same hydraulic aggregate (40).

2. The land vehicle of claim 1, wherein the support leg (4) can be swiveled between a raised storage position and a substantially vertical operating position.

3. The land vehicle of claim 2, wherein securing means (43) are provided, which function to stabilize an orientation of the support leg (4) in the storage position.

4. The land vehicle of claim 3, wherein the securing means (43) engage with one of the at least two tubular portions and wherein one of the at least two tubular portions carries a support foot (12), of the support leg (4).

5. The land vehicle of claim 1, wherein a spring-mounted support foot (12) is disposed at an end face on the support leg (4).

6. The land vehicle of claim 5, wherein the support foot (12) comprises a swivelable plate (13).

7. The land vehicle of claim 1, wherein the hydraulic cylinder (9) of the swiveling drive (8) is linked to the bearing shoe (32) as well as to the one (5) of the at least two tubular portions (5, 6) of the support leg (4) that is mounted to swivel in the bearing shoe (32), or to a part rigidly connected thereto.

8. The land vehicle of claim 1, wherein the tubular portions (5, 6) of the support leg (4) have a round cross section.

9. The land vehicle of claim 1, wherein the tubular portions (5, 6) of the support leg (4) have a polygonal cross section.

10. The land vehicle of claim 1, wherein the tubular portions (5, 6) are guided relative to one another by means of sliding bearing pieces (20).

11. The land vehicle of claim 1, wherein each corner support unit (3) has a tubeless hydraulic system, wherein a hydraulic rotating coupling (29) is provided in a region of the respective swiveling axis (A) of the support leg (4) in question.

12. The land vehicle of claim 1, wherein a central control and regulating unit with an electronic leveling unit is provided to control the hydraulic aggregates (40).

13. The land vehicle of claim 1, wherein an external hydraulic pressure accumulator is provided.

14. A land vehicle (1) with a chassis (2) and a plurality of corner support units (3) attached thereto, wherein:
    each of the corner support units (3) has a support leg (4), which is mounted in a bearing shoe (32) attached rigidly to the land vehicle (1) so as to swivel around a substantially horizontal axis (A)
    a length of the support leg (4) can be varied telescopically;
    the support leg (4) comprises at least two tubular portions (5, 6) that can be displaced relative to one another in a longitudinal direction (X) of the support leg;
    a hydraulic cylinder (19), by means of which a position of the at least two tubular portions (5, 6) relative to one another and thus the length of the support leg (4) can be changed, is disposed in an interior of the support leg (4);
    each corner support unit (3) is assigned a hydraulic aggregate (40) of its own, respectively disposed on the bearing shoe (32) of the corner support unit (3) in question,
    wherein each corner support unit (3) has a tubeless hydraulic system, wherein a hydraulic rotating coupling (29) is provided in a region of the respective swiveling axis (A) of the support leg (4) in question.

15. The land vehicle of claim 14, wherein the hydraulic cylinder (19) disposed in the interior of the support leg (4) also causes swiveling of the support leg (4).

16. The land vehicle of claim 15, wherein a sliding block guide (33) is provided, which couples the length variation and the swiveling of the support leg (4) mechanically with one another.

17. The land vehicle of claim 16, wherein a geometry of the sliding block guide (33) is configured in such a way that, during lengthening of the support leg (4), the swiveling movement of the support leg (4) from a storage position into an operating position takes place during a relatively small fraction of a stroke length of one of the at least two tubular portions (5, 6) relative to the other of the at least two tubular portions (5, 6) of the support leg (4).

* * * * *